United States Patent
Sasson et al.

(10) Patent No.: US 10,961,368 B2
(45) Date of Patent: Mar. 30, 2021

(54) PROCESS FOR TREATING PLASTIC WASTE

(71) Applicant: YISSUM RESEARCH DEVELOPMENT COMPANY OF THE HEBREW UNIVERSITY OF JERUSALEM LTD., Jerusalem (IL)

(72) Inventors: Yoel Sasson, Jerusalem (IL); Uri Stoin, Jerusalem (IL)

(73) Assignee: Yissum Research Development Company of the Hebrew University of Jerusalem Ltd., Jerusalem (IL)

(*) Notice: Subject to any disclaimer, the term of this patent is extended or adjusted under 35 U.S.C. 154(b) by 0 days.

(21) Appl. No.: 16/067,887

(22) PCT Filed: Jan. 3, 2017

(86) PCT No.: PCT/IL2017/050009
§ 371 (c)(1),
(2) Date: Jul. 3, 2018

(87) PCT Pub. No.: WO2017/118975
PCT Pub. Date: Jul. 13, 2017

(65) Prior Publication Data
US 2020/0262997 A1      Aug. 20, 2020

Related U.S. Application Data

(60) Provisional application No. 62/274,802, filed on Jan. 5, 2016.

(51) Int. Cl.
C08J 11/20        (2006.01)
C08J 11/12        (2006.01)

(52) U.S. Cl.
CPC ............. *C08J 11/20* (2013.01); *C08J 11/12* (2013.01); *C08J 2323/06* (2013.01); *C08J 2325/06* (2013.01); *C08J 2327/06* (2013.01)

(58) Field of Classification Search
USPC ............ 521/46.5; 528/271, 272, 274
See application file for complete search history.

(56) References Cited

U.S. PATENT DOCUMENTS

| | | |
|---|---|---|
| 6,127,435 A | 10/2000 | Robin et al. |
| 6,174,928 B1 | 1/2001 | Mizuide et al. |
| 6,329,471 B1 | 12/2001 | Mizuide et al. |
| 9,758,375 B2 | 9/2017 | Sasson et al. |
| 2003/0146547 A1 | 8/2003 | Fischer et al. |

FOREIGN PATENT DOCUMENTS

| | | |
|---|---|---|
| CN | 1481413 A1 | 3/2004 |
| CN | 104203437 A | 12/2014 |
| DE | 4222598 A1 | 1/1994 |
| EP | 0664314 A1 | 7/1995 |
| JP | 61-192748 A | 8/1986 |
| SU | 1054375 A | 11/1983 |
| WO | WO 2013/093903 A1 | 6/2013 |
| WO | WO 2015/170317 A1 | 11/2015 |

OTHER PUBLICATIONS

International Search Report for PCT/IL2017/050009, dated Apr. 11, 2017 (5 pages).
Czop, M. et al., "The influence of selected chemicals on degradation of polyolefin plastics," *Chemik*, vol. 66, No. 4, pp. 307-314 (2012).
Stoin, U. et al., "In situ Generation of Superoxide Anion Radical in Aqueous Medium under Ambient Conditions," *ChemPhysChem*, vol. 14, pp. 4158-4164 (2013).
Lee, Ki Yong et al., "Use of ionic liquids as absorbents to separate $SO_2$ in $SO_2/O_2$ in thermochemical processes to produce hydrogen," *International Journal of Hydrogen Energy*, Nov. 2008, pp. 6031-6036, vol. 33, Issue 21 (abstract only).
Wang, Yong et al., "Reaction Mechanism Study for the Synthesis of Alkylimidazolium-based Halide Ionic Liquids," *Acta Phys.—Chim. Sin.*, May 2005, pp. 517-522, vol. 21, Issue 5.

*Primary Examiner* — Terressa Boykin
(74) *Attorney, Agent, or Firm* — Bookoff McAndrews, PLLC

(57) ABSTRACT

Processes of treating plastic waste that include converting one or more plastic polymers into a liquid form either by dissolving in an organic solvent or by melting, and degrading the polymer(s) with the aid of alkali hydroxide and hydrogen peroxide are described. The processes can be performed in the presence of a phase transfer catalyst.

11 Claims, 3 Drawing Sheets

PROCESS FOR TREATING PLASTIC WASTE

Figure 1:
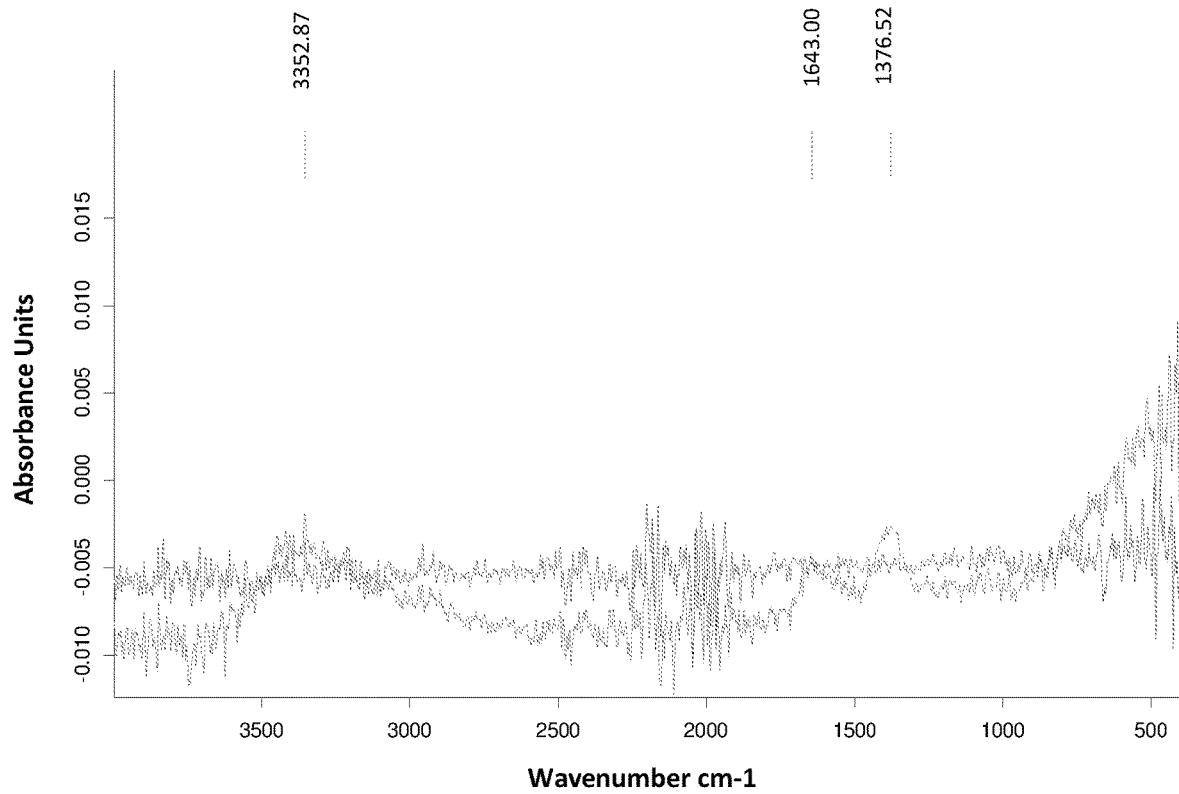

This application is a U.S. national stage filing under 35 U.S.C. § 371 of International Application No. PCT/IL2017/050009, filed on Jan. 3, 2017, which claims the benefit of priority to U.S. Provisional Application No. 62/274,802, filed on Jan. 5, 2016.

Over the past 60 years, plastic has become a useful and versatile material with a wide range of uses and its applications are expected to increase as more new polymeric materials are developed to meet demands. In parallel, plastic wastes are of serious concern as most of them are not biodegradable and in many instances, they end their life as environmental pollutants.

Plastic materials with the greatest demand are low-density polyethylene, high-density polyethylene, polypropylene, poly(vinylchloride) and polystyrene. These polymers are very stable and exhibit an extremely low degradation rate in the environment.

Therefore, there exists a need for an effective technology for degrading plastic waste. There are several well-known technologies for polymer oxidation and degradation such as thermal decomposition, incineration, photochemical and electrochemical oxidation.

However, little has been reported about the application of advanced oxidation processes to treat plastic waste. Czop et al. [CHEMIK 66 (4) p. 307-314 (2012)] tested the degradation of polyolefin waste with the aid of four inorganic reagents (hydrogen peroxide, sodium hydroxide, hydrochloric acid and sulphuric acid). The test method reported in the paper consists of immersing the waste (in a granular form) in the aqueous reagent with a moderate UV irradiation at ambient temperature (22° C.)

A novel method for in-situ generation of a stable superoxide anion in water by reacting sodium or potassium hydroxide with hydrogen peroxide under ambient conditions has been recently reported (WO 2013/093903; Stoin, U. et al. ChemPhysChem, 2013, 14, 4158; WO 2015/170317). The superoxide radical anion ($O_2^-$.) is an active oxygen species that possesses both anionic and free radical properties. The aqueous reagent formed on combining together hydrogen peroxide and alkali hydroxide was effectively utilized for the destruction of bulk of carbon tetrachloride and other chlorinated methane and ethane compounds and also petroleum products (e.g., diesel oil) in soil.

It has now been found that plastic polymers in a liquid form, that is, either dissolved in an organic solvent or in a molten state, are susceptible to attack by the aqueous reagent formed on combining together alkali hydroxide and hydrogen peroxide. The combined reagent can therefore be used in the degradation of plastic waste to minimize environmental pollution. The degradation products include oxidation reaction products, such as carboxylic acids and alcohols, which are readily recoverable. The degradation of the plastic polymer is optionally advanced with the aid of a phase transfer catalyst present in the reaction mixture.

The invention is therefore primarily directed to a process for treating plastic waste, comprising converting one or more plastic polymers into a liquid form either by dissolving in an organic solvent or by melting, and degrading said polymer(s) with the aid of alkali hydroxide and hydrogen peroxide, optionally in the presence of a phase transfer catalyst.

One variant of the process comprises dissolving one or more plastic polymers in an organic solvent and degrading said polymer with the aid of alkali hydroxide and hydrogen peroxide, optionally in the presence of a phase transfer catalyst. One or more products of the degradation reaction, i.e., oxidation products, can be recovered.

Another variant of the process comprises melting one or more plastic polymers and degrading said polymer with the aid of alkali hydroxide and hydrogen peroxide, optionally in the presence of a phase transfer catalyst. One or more products of the degradation reaction, i.e., oxidation products, can be recovered.

Plastic polymers which undergo degradation under the conditions set forth above include—but are not limited to—the four major thermoplastic polymers: polyethylene (PE), polypropylene (PS), polystyrene (PS) and poly(vinyl chloride) (PVC). Polyethylene is divided into low-density and high-density polyethylene (LDPE and HDPE, respectively); the experimental results reported below indicate that both LDPE and HDPE are treatable with the process of the invention. In addition to the aforementioned homopolymers, various thermoplastic copolymers can be degraded with the process of the invention.

The dissolution of the polymer in the organic solvent can be achieved at room temperature or under heating, e.g., the dissolution temperature is from room temperature to about 160° C. Suitable organic solvents include water-immiscible liquids (with solubility below 1 g per 100 ml water at 20° C.), in particular aromatic hydrocarbons (for example, benzene and alkyl-substituted benzene derivatives such as toluene and xylene) and halogenated hydrocarbons (for example, dichloromethane and dichloroethane). Some polymers dissolve readily in water-miscible solvents (with solubility above 10 g per 100 ml water at 20° C.), for example, in ethers such as tetrahydrofuran (THF) and in ketones such as cyclopentanone. Solvents showing water solubility in the range from 1 g to 10 g per 100 ml water at 20° C., for example, ketones such as cyclohexanone, can also be used.

Dissolution temperatures for some major thermoplastic polymers in some selected solvents are set forth below (RT indicates 'room temperature'; NS indicates 'not soluble').

TABLE 1

Dissolution temperatures

|  | Toluene | Xylene | THF |
| --- | --- | --- | --- |
| LDPE | 90 | 100 | 65* |
| HDPE | 90 | 100 | 160* |
| PP | 105* | 118* | 160* |
| PS | RT | RT | RT* |
| PVC | NS* | 138* | RT* |

Data set forth in Table 1 is based on experimental work performed in connection with this invention or on published data (from EP 664314; indicated by *).

The polymer is preferably first subjected to shredding and then introduced into the organic solvent. The weight percent of the polymer in the organic solution is from 10% to 90%, preferably from 40% to 80%.

Having dissolved the plastic polymer in the organic solvent, the two reagents: alkali hydroxide (MOH; either in a solid form or in an aqueous form, i.e., as an aqueous solution having concentration of not less than 3M, e.g., not less than 6M, more preferably not less than 13M, e.g., from 6M to 25M) and hydrogen peroxide (in the form of aqueous solutions available on the market, such as the industrial strength solutions of 30-70 wt %, e.g., the 30 wt % solution), are combined with the polymer-containing organic solution. The relative amounts of the alkali hydroxide and hydrogen peroxide are adjusted such that the molar ratio between the hydrogen peroxide and the hydroxide ion is preferably at least 1.1:1, more preferably at least 1.2:1, e.g., in the range of 1.2:1 to 1.8:1, with a ratio of 1.4:1 to 1.6:1, and especially about 1.5:1, being most preferred. The volumetric ratio between the organic solvent and water in the reaction mixture is from 1:10 to 1:1, preferably from 1:5 to 1:1.

It is preferred to add the aqueous reagents to the reaction vessel via two separate feed streams, to be fed either simultaneously or successively. Simultaneous feeding of separate streams is also meant to include the feeding of alkali hydroxide and hydrogen peroxide streams which partially overlap in time. Premixing of alkali hydroxide and hydrogen peroxide, followed by the feed of a combined stream of both reagents to the reaction vessel is also possible, provided that the premixing of the alkali hydroxide and hydrogen peroxide is carried out under conditions allowing the instantaneous addition of the so-formed aqueous mixture into the organic solution, preferably such that the time which elapses between the aqueous mixture formation and its being fed will be less than about 5 seconds. This could be accomplished with the aid of a suitably configured jet mixer. However, it is most preferred to bring together the alkali hydroxide and hydrogen peroxide in an alkaline aqueous environment. The alkaline aqueous environment can be created by first adding the alkali hydroxide (or at least a portion thereof) to the organic solution, followed by the addition of hydrogen peroxide, as described in greater detail below.

When the polymer degradation takes place in a water immiscible organic solvent, then the reaction is preferably advanced with the aid of a phase transfer catalyst. The concentration of phase transfer catalyst is from 0.01 to 10 wt % of the total weight of the reaction mixture, and more preferably from about 0.1 to 1%.

Phase transfer catalysts which are suitable for use are preferably composed of a nitrogen-containing cation and a counter anion, e.g., halide anion (designated herein Hal$^-$). For example, quaternary ammonium halide salts N$^+$R$_1$R$_2$R$_3$R$_4$Hal$^-$, wherein each of R$_1$, R$_2$, R$_3$ and R$_4$ is independently C1-C18 alkyl group (preferably C1-C12 alkyl, which may be either linear or branched, most preferably linear) are suitable for use to facilitate the degradation of plastic polymers according to the invention. Experimental work reported below indicates that ionic liquids can be successfully employed as phase transfer catalysts. Especially preferred are ionic liquids of the formula N$^+$CH$_3$[(CH$_2$)$_k$CH$_3$]$_3$Hal$^-$, wherein k is at least 5, e.g., between 5 to 9, and Hal is chloride or bromide. As an example, methyltrioctyl ammonium halide can be mentioned (k=7), which is commercially available in the form of its chloride salt as Aliquat 336. Ionic liquids where the nitrogen-containing cation consists of a nitrogen-containing ring, such as 1-alkyl-3-methylimidazolium halide salt, for example, 1-butyl-3-methylimidazolium halide, can also be used. Halide nitrogen-containing ionic liquids are commercially available or can be prepared by reacting the nitrogen-containing moiety with a suitable alkyl halide. Synthetic methods for making halide ionic liquids are described, for example, by Lee at al. [Int. J. of Hydrogen Energy, 33, p. 6031-6036, (2008)] and Wang at al. [Acta Phys.-Chim. Sin., 21(5), p. 517-522 (2005)].

As mentioned above, it is preferred to bring together the alkali hydroxide and hydrogen peroxide in an alkaline aqueous environment. High alkaline pH range is believed to be beneficial for the superoxide species that is generated in the aqueous phase on combining the two reagents together. For this reason, the preferred order of reagents' addition consists of first feeding the alkali hydroxide in the form of an aqueous solution to the polymer-containing organic solution, followed—if needed—by the addition the phase transfer catalyst, with the aqueous hydrogen peroxide being the last added reagent.

There are no special requirements placed on the rate of addition of the alkaline solution and the phase transfer catalyst. However, the addition of the hydrogen peroxide solution is preferably carried out over a period of time of not less than five minutes ('addition time'). The hydrogen peroxide solution is gradually fed to the reaction vessel, preferably at a fairly slow rate, e.g., from 0.5 ml/min to 10 ml/min on a laboratory scale.

Regarding the temperature of the process, the data shown in Table 1 indicates that in some cases the dissolution of the polymer in the organic solvent is achieved at room temperature, whereas in other cases it can only be attained with heating to a high temperature, for example, around 100° C. and above.

In those cases where the dissolution of the polymer can be accomplished at room temperature (e.g., polystyrene), then the subsequent addition of aqueous reagents and degradation reactions is also carried out at room temperature. Alternatively, the degradation process consisting of polymer dissolution and the addition of the aqueous reagents may take place under heating.

In those cases where the dissolution of the polymer can only be achieved under heating (e.g., polyethylene), then it is generally better to add the aqueous reagents at a lower temperature than the dissolution temperature, in order to minimize losses of the volatile hydrogen peroxide. However, the addition temperature must not be too low, in order not to induce the precipitation of the polymer from the solution. It has been found that the addition of the aqueous reagents can take place within a 'temperature window' which is below the dissolution temperature. Thus, in a preferred embodiment of the invention, the addition of the aqueous reagents is carried out while the reaction mixture is allowed to cool down. That is, on achieving full dissolution of the polymer in the organic solvent—on a laboratory scale a clear solution is typically formed within less than thirty minutes, e.g., in about ten to twenty minutes—the heating of the organic solution is halted and the solution starts to cool down spontaneously. The addition of the aqueous reagents may be commenced and completed within a cool-down interval of ten to twenty degrees below the dissolution temperature; over this cool-down temperature interval there is no indication of separation out of the polymer from the solution, suggesting that the degradation reactions suppress the solidification of the polymer from the very beginning.

The degradation (e.g., oxidation) reaction takes place over the addition of the aqueous reagents to the polymer-containing organic solution, with vigorous stirring. After the addition has been completed, the reaction mixture is simply allowed to further cool down to reach about room temperature. Optionally, the reaction mixture may be subjected to distillation to allow water recycling, but this is of course not mandatory for the isolation of the organic products, which are readily recoverable from the reaction mixture using conventional methods, as illustrated below.

The use of a water-immiscible organic solvent such as toluene, xylene or halogenated hydrocarbons for dissolving the polymer leads to the formation of a final reaction mixture which is separable into an organic phase and an aqueous phase (though in some cases an organic solvent may be added to facilitate phase separation). On further treating the separated organic phase, e.g., by extraction followed by removal of the organic solvent, e.g., by evaporation, a viscous organic residue is left, consisting of the degradation products.

The use of a water-miscible solvent such as THF at the polymer dissolution stage results in the formation of a reaction mixture separable into two phases: a THF/water mixture and an organic phase consisting of the degradation products.

The successful degradation of the plastic polymers owing to the process of the invention can be determined by different techniques. For example, oxidation reaction products of polyolefin are fairly easy to detect by spectroscopic techniques on account of the strong absorption of the carbonyl group in the spectrum of polyolefin. Gas chromatography may also be used as a qualitative technique to confirm the formation of degradation products. Polymer degradation can also be indicated by changes measured in physical properties, such as decreased molecular weight of the reaction product in comparison with the intact polymer, measurable by gas permeation chromatography, or deterioration of mechanical properties.

The so-formed mixture of degradation products may be further treated by conventional methods to isolate individual components such as carboxylic acids, alcohols and aldehydes.

As mentioned above, the aqueous $H_2O_2$/MOH reagent of the invention can also be used to attack molten thermoplastic materials to degrade them. Thermoplastic materials display reversible melting-solidification processes, regaining their properties on return to a solid form. However, the experimental results reported below indicate that addition of the aqueous $H_2O_2$/MOH reagent to the thermoplastic melt, followed by solidification of the reaction mass, leads to the formation of a solid devoid of the characteristic mechanical properties (e.g., properties that can measured by test instrument such as Instron®). The loss of mechanical properties indicates the degradation of the polymer.

The waste polymer is shredded and loaded in the form of chips etc. into a suitable apparatus. The degradation of thermoplastic polymer according this variant of the invention takes place in any apparatus enabling polymer melt formation and efficient injection of aqueous solutions (e.g., two separate streams consisting of MOH+PTC and $H_2O_2$, respectively) into the molten mass. To this end, equipment used in the plastic industry for polymer processing such as hot presses, single screw and twin screw extruders may be used. For example, an extruder with downstream ports through which liquids could be added into the advanced molten mass. It is also known to melt a polymer by contacting the polymer (e.g., in the form of chips) with a heated perforated grid from which the heat is passed to the polymer by conduction or by charging the polymer to a suitable furnace, as described, for example, in U.S. Pat. No. 2,515, 136. The solid polymer is melted and drops into a receiving vessel held at an appropriate temperature to keep the mass in a molten form, followed by addition of the reagents to the melt.

As to the reagents added to the molten polymer, the same solutions previously described for the "polymer in solution" variant can be used (e.g., same concentrations, compositions, order of addition, PTC etc.)

IN THE DRAWINGS

FIG. 1 is FTIR spectra for intact polyethylene and the reaction product collected following the process of the invention.

Figure 2A:
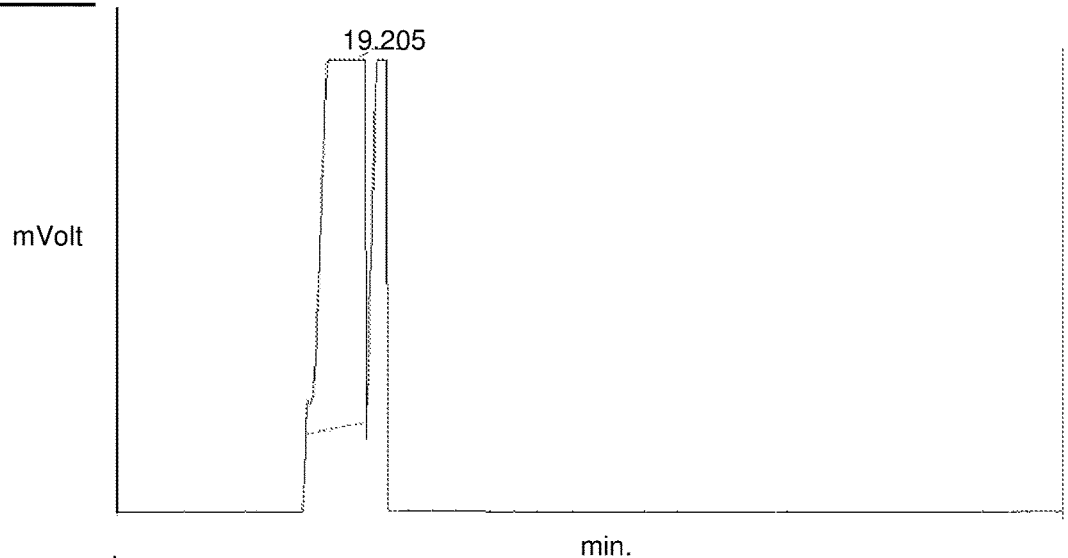
Figure 2B:
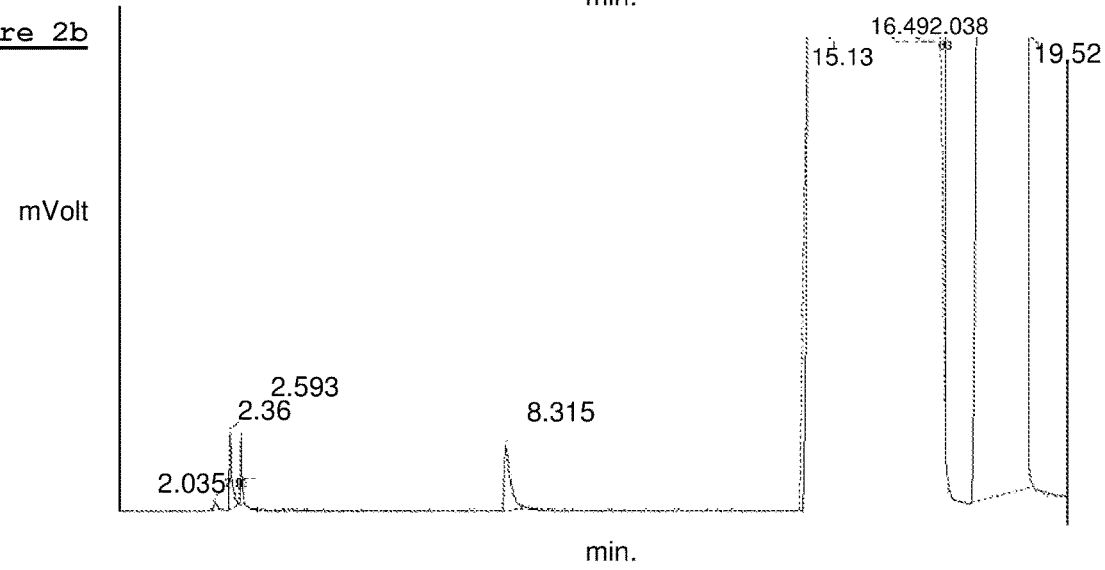

FIGS. 2a and 2b provide GC chromatograms for intact polyethylene in xylene (2a, top) and for the reaction products in xylene (2b, bottom).

Figure 3:
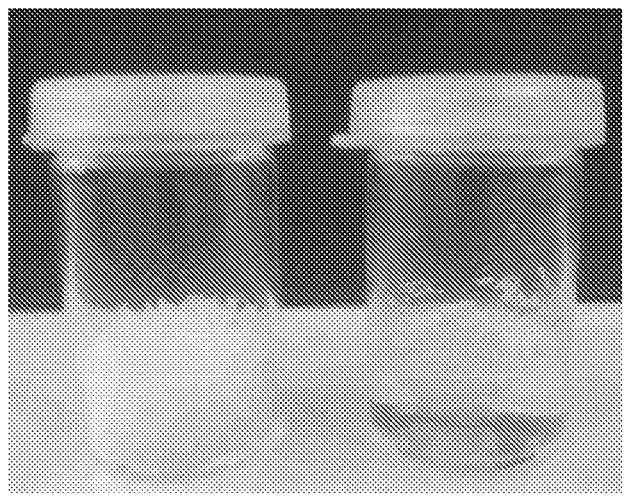

FIG. 3 shows photos of the original PVC pellets (left bottle) and the final organic product consisting of a transparent viscous organic liquid (right bottle).

EXAMPLES

Measurements

Fourier Transform Infrared spectroscopy (FTIR): the FTIR instrument used was Peact IR 4000, manufactured by Metler Ltd.

Gas Chromatography (GC): GC studies were conducted using Famewax column, 30 m, 0.32 mm ID, 0.25 mm (Restek™ Famewax).

Gas permeation chromatography (GPC): the instrument used was Waters 2690 GPC (dissolution in chloroform).

Mechanical properties were measured with the aid of Instron 4502, load capacity of 10N, 10 Kn.

Examples 1-4

Degradation of Polyethylene (HDPE and LDPE) in a Solvent at High Temperature 50 ml round bottom flask equipped with a reflux condenser and a magnetic stirrer was charged with 1 g of HDPE or LDPE [HDPE pellets with average Mw 35,000 and average Mn 7,700 manufactured by Sigma-Aldrich Ltd.; LDPE pellets with average Mw 4,000 and average Mn 1,700 manufactured by Sigma-Aldrich Ltd.]. Then 2 ml of an organic solvent (either xylene or toluene) was added to the flask and heated to dissolve the polyethylene. Experimental conditions are set forth below:

TABLE 2

| Example | polyethylene | Organic solvent | Dissolution temperature | Time required for dissolution |
|---------|--------------|-----------------|-------------------------|-------------------------------|
| 1 | HDPE | xylene | 100° C. | ~30 minutes |
| 2 | HDPE | toluene | 90° C. | ~30 minutes |
| 3 | LDPE | xylene | 100° C. | ~15 minutes |
| 4 | LDPE | toluene | 90° C. | ~15 minutes |

On achieving a clear solution, the heating was turned off. Then, an aqueous sodium hydroxide solution was added through a pressure-equalizing dropping funnel over three minutes. The concentration of the alkaline solution was 12M, and the volume of NaOH solution added was 4 ml.

Next, 0.1 ml of the phase transfer catalyst (Aliquat 336) was added to the flask, followed by the gradual addition of 4 ml of hydrogen peroxide 30% solution over ten minutes through the pressure-equalizing dropping funnel.

The reaction mixture was allowed to cool down to room temperature, and was separated into an organic phase and an aqueous phase. The organic phase was collected and extracted with 10 ml of dichloromethane and the remaining solid was filtrated. The organic solvent (dichloromethane) was evaporated from the organic phase and remaining organic liquid was collected (reaction end products).

The degradation of the polyethylene via the oxidation reaction led to the formation of valuable organic products, which are detectable by infrared spectroscopy and gas chromatography:

The FTIR spectra for intact polyethylene and the reaction product are shown in FIG. 1 to allow comparison. The peaks at approximately 3300 cm$^{-1}$, 1700 cm$^{-1}$ and 1300 cm$^{-1}$ noted in the spectrum of the reaction product are assigned to carboxylic acid, carbonyl and alcohol groups. These characteristic peaks are not seen in the spectrum of the intact polymer.

FIG. 2 shows GC chromatograms for intact polyethylene in xylene (2a, top) and for the reaction products in xylene (2b, bottom). The chromatogram of the aboriginal PE is devoid of any peaks other than those attributed to the solvent. However, additional organic signals are detectable in the chromatogram of the reaction product, indicating the degradation of the polyethylene into organic compounds.

Example 5

Degradation of Poly(Vinyl Chloride) in a Solvent at Room Temperature

Into 50 ml round bottom flask loaded with 1 g of PVC [low molecular weight PVC pellets available from by Sigma-Aldrich Ltd] and equipped with a magnetic stirrer was added 2 ml of dichloroethane solvent. After 20-30 minutes the PVC was completely dissolved.

An aqueous sodium hydroxide solution was added through a pressure-equalizing dropping funnel over three minutes. The concentration of the alkaline solution was 12M, and the volume added was 4 ml.

Next, 0.1 ml of the phase transfer catalyst Aliquat 336 was added to the flask, followed by the gradual addition of 4 ml of hydrogen peroxide 30% solution over ten minutes through the pressure-equalizing dropping funnel.

The reaction mixture was separated into an organic phase and an aqueous phase. The organic phase was extracted with hexane (10 ml) and the remaining solids (consisting of salts and residual polymer) were removed by filtration.

FIG. 3 shows photos of the original PVC pellets (left bottle) and the final organic product consisting of a transparent viscous organic liquid (right bottle). Mechanical properties of the reaction product were recorded. To this end, the viscous product was formed into test specimens in the form of thin films by subjecting the sample to melting and pressing in a suitable press device. The so-formed films were then tested in Instron 4502 to measure stress at break and Young's modulus. A decline in the mechanical properties was noted, indicating the degradation of the PVC.

Examples 6-8

Degradation of Polystyrene in a Solvent at High Temperature and Room Temperature The procedures set forth in preceding examples were repeated to investigate polystyrene degradation at high temperature and room temperature. The experimental details are summarized in Table 3. The polystyrene tested consists of PS pellets manufactured by Sigma-Aldrich Ltd.

TABLE 3

| Example | Organic solvent | Temperature of the solution | Time required for dissolution |
|---|---|---|---|
| 6 | xylene | 100° C. | ~15 minutes |
| 7 | toluene | 90° C. | ~15 minutes |
| 8 | xylene | RT | ~20 minutes |

The reaction product, isolated in the form of a viscous liquid, was tested to determine its molecular weight. The weight average molecular weight (Mw) and the number average molecular weight (Mn) were measured with the aid of Waters 2690 GPC and were found to be ~66,000 and ~22,000, respectively, with a polydispersity index, defined as the ratio Mw/Mn, being about 3.0. The Mw and Mn measured for the reaction product are appreciably lower than those measured for the commercial, intact polystyrene (Mw=~159,000 and Mn=~69,000). The GPC analysis therefore indicates that the polystyrene underwent degradation.

The degradation of the polystyrene can be further shown by comparing the mechanical properties of the original polystyrene with the properties of the reaction product. For the intact, commercial polystyrene, the stress at break was found to be 3.535 MPa and Young's modulus 249.679 MPa. To determine the properties of the reaction product, a sample thereof was formed into test specimens as described above, and the thin films obtained were tested in Instron 4502. A decreased stress at break and a sharp drop of Young's modulus were observed, in comparison with the intact, commercial polystyrene (for the reaction product, the stress at break was found to be 0.428 MPa and Young's modulus 26.578 MPa).

Example 9

Degradation of Polyethylene (HDPE) in a Melt

Hot press (model: PT-EHP-25T) was heated to temperature of 250° C. and was loaded with 1 g of HDPE [HDPE pellets with average Mw 35,000 and average Mn 7,700]. Two different syringes—one containing a mixture consisting of 2 gr of sodium hydroxide dissolved in 6 ml of water and 0.1 ml of Aliquat 336, and the other filled with 4 ml hydrogen peroxide (30%)—were used to slowly inject the reagents into to the semi molten sample of HDPE. After 30 minutes, the heating was turned off and spontaneous cooling of the system was allowed, to reach room temperature. The organic leftovers of the end product was separated, extracted and dried in an oven at 100° C.

Aboriginal PE's are elastic materials. The end product, on the other hand, was found to be crushable and it was impossible to test it by Instron. Hence, the results indicate the loss of plastic properties on oxidation with the H$_2$O$_2$/NaOH reagent; that is, the end product is not PE.

The invention claimed is:

1. A process of treating plastic waste, comprising converting one or more thermoplastic polymers selected from the group consisting of polyethylene, polypropylene, polystyrene, and poly(vinyl chloride) into a liquid form either by dissolving in an organic solvent or by melting, and degrading said polymer(s) with the aid of alkali hydroxide and hydrogen peroxide.

2. A process of treating plastic waste according to claim 1, comprising dissolving the one or more thermoplastic polymers in the organic solvent and degrading said polymer(s) with the aid of alkali hydroxide and hydrogen peroxide.

3. A process according to claim 2, wherein the alkali hydroxide and hydrogen peroxide are brought together in an alkaline aqueous environment.

4. A process for treating plastic waste according to claim 3, comprising charging a reaction vessel with the organic solvent and the one or more thermoplastic polymers, dissolving the polymer(s) in the solvent, adding aqueous alkali hydroxide to the solution, and gradually feeding hydrogen peroxide solution to the reaction vessel.

5. A process according to claim 2, wherein the organic solvent is a water-immiscible organic solvent, and wherein a phase transfer catalyst is added to a reaction vessel containing the organic solvent and the one or more thermoplastic polymers.

6. A process according to claim 5, further comprising separating a reaction mixture formed by degrading said polymer(s) into an organic phase and an aqueous phase, and recovering polymer degradation products from the organic phase.

7. A process of treating plastic waste according to claim 1, comprising melting the one or more thermoplastic polymers and degrading said polymer(s) with the aid of alkali hydroxide and hydrogen peroxide.

8. A process according to claim 1, wherein the one or more thermoplastic polymers is selected from the group consisting of high density polyethylene and low density polyethylene.

9. A process according to claim 1, wherein degrading said polymer(s) is performed in the presence of a phase transfer catalyst.

10. A process according to claim 2, wherein degrading said polymer(s) is performed in the presence of a phase transfer catalyst.

11. A process according to claim 7, wherein degrading said polymer(s) is performed in the presence of a phase transfer catalyst.

* * * * *